Patented Feb. 17, 1925.

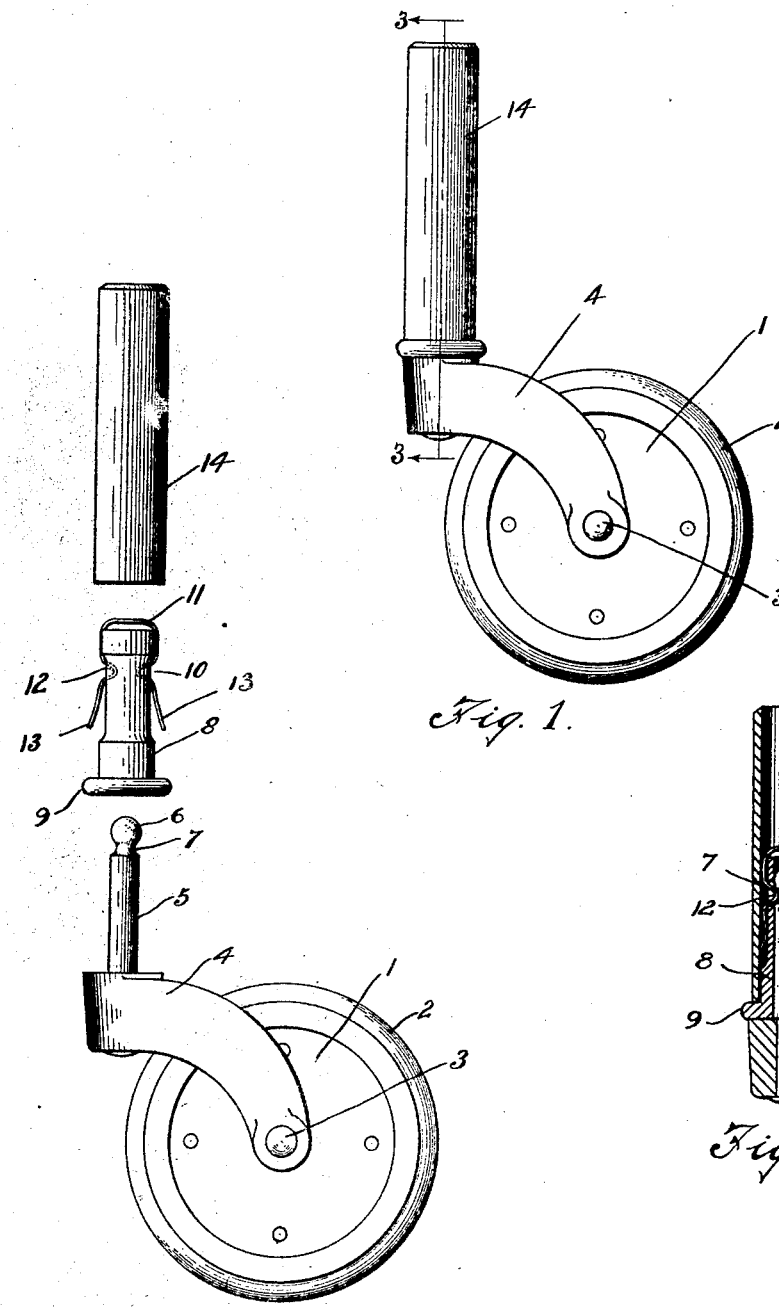

1,526,478

UNITED STATES PATENT OFFICE.

NELSON L. JARVIS AND FRANK J. JARVIS, OF PALMER, MASSACHUSETTS.

CASTER.

Application filed March 7, 1924. Serial No. 697,542.

*To all whom it may concern:*

Be it known that we, NELSON L. JARVIS and FRANK J. JARVIS, citizens of the United States, residing at Palmer, in the county of Hampden and State of Massachusetts, have invented certain new and useful Improvements in Casters, of which the following is a specification.

This invention relates to casters and has for its leading object the provision of a bearing for the caster pin, and a second bearing on the article to which the caster is applied, and yielding means for holding both bearings in adjusted position.

A further object of the invention is the provision of single yielding means that will hold the pin bearing in place on the caster and at the same time hold the second bearing in place in the bearing on the article to which the caster is applied.

A further object of the invention is the provision of simple and economical means that will provide a bearing for the caster pin, a socket for the caster pin bearing, and means for yieldingly holding the parts together.

Other objects and advantages of the invention should be readily apparent by reference to the following specification taken in connection with the accompanying drawings, and it will be understood that any modifications or departures may be made from the specific features disclosed within the scope of the claims without departing from or exceeding the spirit of the invention, a preferred form only of the device being shown for sake of and by way of illustration.

Figure 1 is an outside elevation of the caster showing all the parts in place.

Figure 2 is a detached elevation of the invention showing the parts arranged one above the other in the order in which they go in place.

Figure 3 is a cross section on line 3—3 of Figure 1.

Referring to the drawings, the numeral 1 is the wheel portion of the caster, having a rubber tire 2 and pivoted at 3 in the caster fork 4. Rising from the caster fork 4 is the bearing pin 5 which is finished to a smooth bearing surface and terminates in a ball portion 6 which surmounts a recessed grooved portion 7 between the ball and the body portions. Fitting over the bearing pin 5 is a socket bearing sleeve 8 having a flange 9 resting upon the shoulder of the fork 4, from which the bearing pin 5 rises. This socket bearing sleeve 8 is smoothly bored on the inside to form a bearing surface for the pin 5 and is provided with holes or slots 10 adapted to align with the groove 7 in the bearing pin 5. The socket bearing sleeve 8 is maintained in its operative position on the bearing pin 5 by means of a spring 11 which is bent around the outside of the socket bearing sleeve 8, as shown in Figure 2, and indented at 12 on each side to enter the recesses 10 and the groove 7 to lock the socket bearing sleeve 8 in operative place on the pin 5. After entering the recesses 10 the spring is reversely bent and emerges from the recesses and forms protruding tongues 13 on each side. The object of these tongues 13 is to hold the socket bearing sleeve yieldingly in place in the receiving tube 14 which tube 14 is a part of or secured in the object to which the casters are to be applied. This tube 14 is ordinarily a part of the article to which the caster is applied, such as for instance the leg of a bed, formed of tubing, or having a tube inserted therein, or under the bodies of carts, wagons, furniture and other articles.

The device is assembled as follows:

The article which is to be fitted with casters is provided with a receiving tube portion 14, either integrally or separately made. The socket bearing sleeve 8 is slipped down on the pin 5 until indents 12 of the spring snap in place in the groove 7 of the pin. The sleeve 8 then is pushed into the tube 14 until the lower end of the tube comes in contact with the upper side of the flange 9 on the sleeve 8, the sleeve being prevented from falling out of the tube 14 by the free extending ends 13 of the spring 11. To disengage the parts the flange 9 of the sleeve 8 is grasped in the fingers and the wheel pulled away from the tube 14, sufficient pressure being exerted to slide the free ends of the spring 13 on the internal walls of the receiving tube 14. This releases the caster and the socket bearing sleeve from the tube 14. The sleeve 8 may be taken from the caster by pulling the sleeve 8 upward with sufficient pressure to force the spring indents 12 out of the groove 7 of the bearing pin.

From the foregoing description it will be seen that we have provided in a simple way yielding means that holds the socket bearing sleeve 8 in place on the bearing pin 5, and at the same time holds the assembled caster in the receiving tube 14 on the device to which the caster is to be attached, providing a free running bearing for the caster and one easily assembled and disassembled.

We claim:

1. In a device of the character described, a bearing pin having a groove, a sleeve bearing having recesses, yielding means projecting through the recesses into the groove and having the free ends extending therebeyond, and a tube fitting over the sleeve and engaging the free ends of the yielding means.

2. In a device of the character described, a bearing pin having a groove, a sleeve having recesses, a bent spring having portions projecting through the recesses into the groove and free end portions extending beyond the recesses, and a tube engaging the free projecting portions of the spring.

3. In a device of the character described, a bearing pin, a sleeve fitting over the bearing pin and a tube fitting over the sleeve, and yielding means having portions adapted to hold the sleeve on the pin and other portions adapted to hold the sleeve in the tube.

4. In a device of the character described, a wheel bracket having a boss, a bearing pin rising from the boss and having a groove, a bearing sleeve fitting over the pin and having a shoulder engaging the boss on the wheel bracket and having recesses aligned with the groove in the bearing pin, a tube over the sleeve resting on the boss flange thereof, and a bent spring having portions indented through the recesses of the sleeve onto the bearing pin, and free extending end portions engaging the inner sides of the tube.

NELSON L. JARVIS.
FRANK J. JARVIS.